United States Patent
Lenzi et al.

(10) Patent No.: US 12,227,628 B2
(45) Date of Patent: Feb. 18, 2025

(54) TOUGHENED COMPOSITE MATERIALS CAPABLE OF DELAMINATION PROPAGATION RESISTANCE

(71) Applicant: CYTEC INDUSTRIES INC., Princeton, NJ (US)

(72) Inventors: Fiorenzo Lenzi, Vitulazio (IT); Vincent Aerts, Wrexham (GB); Marco Aurilia, Naples (IT); Hazel-Ann Hosein, Anaheim, CA (US)

(73) Assignee: CYTEC INDUSTRIES INC., Princeton, NJ (US)

( * ) Notice: Subject to any disclaimer, the term of this patent is extended or adjusted under 35 U.S.C. 154(b) by 709 days.

(21) Appl. No.: 17/416,483

(22) PCT Filed: Dec. 21, 2019

(86) PCT No.: PCT/US2019/068192
§ 371 (c)(1),
(2) Date: Jun. 19, 2021

(87) PCT Pub. No.: WO2020/132662
PCT Pub. Date: Jun. 25, 2020

(65) Prior Publication Data
US 2022/0041825 A1  Feb. 10, 2022

Related U.S. Application Data
(60) Provisional application No. 62/783,871, filed on Dec. 21, 2018.

(51) Int. Cl.
*C08J 5/24* (2006.01)
*C08G 73/10* (2006.01)

(52) U.S. Cl.
CPC .......... *C08J 5/243* (2021.05); *C08G 73/1067* (2013.01); *C08J 5/249* (2021.05); *C08J 2363/00* (2013.01); *C08J 2379/08* (2013.01); *C08J 2479/08* (2013.01)

(58) Field of Classification Search
None
See application file for complete search history.

(56) References Cited

U.S. PATENT DOCUMENTS

| | | | |
|---|---|---|---|
| 4,957,801 A | 9/1990 | Peake et al. | |
| 5,037,689 A | 8/1991 | Boyd | |
| 5,242,748 A | 9/1993 | Folda et al. | |
| 5,248,711 A * | 9/1993 | Buyny ................ | C08L 101/00 525/422 |
| 6,451,480 B1 * | 9/2002 | Gustafson ........... | H01M 10/058 29/623.5 |
| 9,517,608 B2 | 12/2016 | Hill et al. | |

(Continued)

Primary Examiner — Nicole M. Buie-Hatcher
(74) Attorney, Agent, or Firm — Thi Dang

(57) ABSTRACT

A curable composite laminate having an interlaminar region formed between adjacent layers of reinforcement fibers. The interlaminar region contains soluble polyimide particles that are dissolvable in the one or more thermoset resins at a curing temperature of the curable matrix resin, and insoluble thermoplastic particles that remain as discrete particles in the interlaminar region at the same curing temperature. Such curable composite laminate is capable of high resistance to the propagation of delamination upon curing.

14 Claims, 2 Drawing Sheets

After Cure

(56) References Cited

U.S. PATENT DOCUMENTS

| | | | |
|---|---|---|---|
| 2012/0088863 A1* | 4/2012 | Wang | C08G 59/32 |
| | | | 523/435 |
| 2012/0164455 A1 | 6/2012 | Griffin et al. | |
| 2014/0170408 A1 | 6/2014 | Frulloni et al. | |
| 2017/0369662 A1 | 12/2017 | Emmerson et al. | |
| 2018/0100044 A1 | 4/2018 | Baron | |
| 2019/0143633 A1 | 5/2019 | Restuccia et al. | |

* cited by examiner

Before Cure

After Cure

TOUGHENED COMPOSITE MATERIALS CAPABLE OF DELAMINATION PROPAGATION RESISTANCE

CROSS-REFERENCE TO RELATED APPLICATIONS

The instant application is a U.S. national phase entry under 35 U.S.C. § 371 of International Application No. PCT/US2019/068192, filed on Dec. 21, 2019, which claims the benefit of prior U.S. Provisional Application No. 62/783,871 filed on Dec. 21, 2018, the content of each of these applications is incorporated herein by reference in its entirety.

DETAILED DESCRIPTION

Figure 1:
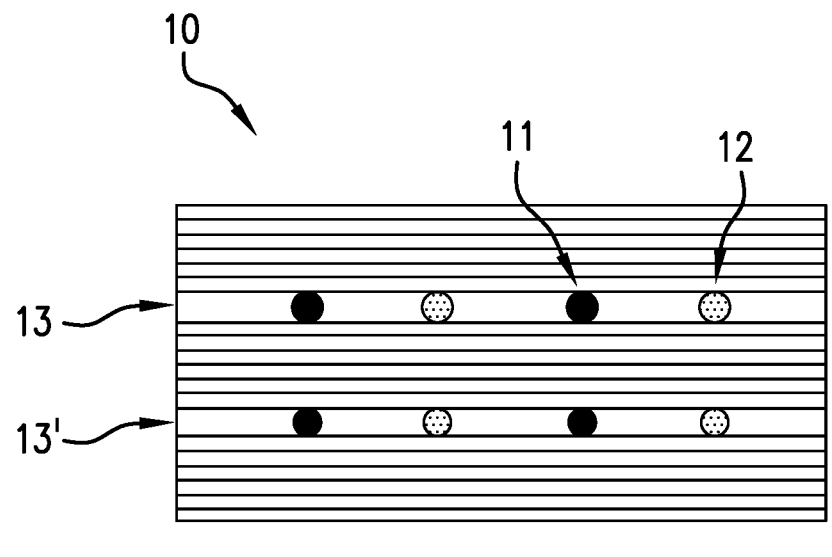
FIG. 1 schematically illustrates a composite laminate containing insoluble particles and soluble polyimide particles at the interlaminar regions before curing.

Composite materials composed of fibre reinforcement and thermoset resins have been used in the manufacture of load-bearing components suitable for use in transport applications, for example, aerospace, aeronautical, marine and land vehicles, and in building and construction applications. Thermoset materials such as cured epoxy resins are known for their thermal and chemical resistance. Such thermoset materials also display good mechanical properties but they frequently lack toughness and tend to be very brittle. This is especially true as the crosslink density of epoxy increases or the monomer functionality of the epoxy increases above two.

For high performance applications, the composite material is typically used in the form of a prepreg, in which continuous reinforcing fibers are pre-impregnated with a controlled amount of uncured resin. The uncured prepreg is malleable and can be moulded into the shape of the final composite part. Conventionally, prepregs are the preferred materials for manufacturing critical load-bearing structures including, but not limited to, wings and fuselage of an aircraft, which require simultaneously high strength, high impact resistance, and high damage tolerance. Multiple layers of prepreg plies can be laid up in a stacking arrangement to form a composite laminate, which can be shaped and then cured to form a hardened composite structure.

Fracture toughness is a property which describes the ability of a material containing a crack to resist fracture, and is one of the most important properties of a material for aerospace applications. Fracture toughness is a quantitative way of expressing a material's resistance to brittle fracture when a crack is present. Fracture toughness may be quantified as strain energy release rate (G), which is the energy dissipated during fracture per unit of newly created fracture surface area. G includes $G_I$ (Mode 1—opening mode) or $G_{II}$ (Mode II—in plane shear). The subscript "I" denotes Mode I crack opening, which is formed under a normal tensile stress perpendicular to the crack, and the subscript "II" denotes Mode II crack produced by a shear stress acting parallel to the plane of the crack and perpendicular to the crack front. The initiation and growth of a delamination is often determined by examining Mode I and Mode II fracture toughness. Delamination occurs when two laminated layers de-bond from each other. Important design limiting factors include the energy needed to initiate the delamination and the energy needed to propagate it. Important design limiting factors include both the energy needed to initiate a delamination and the energy needed to propagate it. These two energies are hereafter reported as $G_{Ic}$ as the energy needed to initiate a delamination under mode I and $G_{Ip}$ as the energy needed to propagate the delamination under mode I.

Traditionally interlaminar toughening particles (ILTP) are incorporated into the interlaminar regions of a multi-layered composite structure to improve fracture toughness by providing high energy for delamination onset in mode I ($G_{Ic}$). The interlaminar region refers to the region between adjacent layers of reinforcement fibers in a composite laminate. It has been found that the energy required for delamination propagation in mode I ($G_{Ip}$) is a factor affecting the durability of composite structures during their service life. In some instances, such energy remains constant as the delamination propagates so the $G_{Ip}$ is similar to $G_{Ic}$. In some other circumstances, however, the energy required for delamination propagation decreases as the delamination propagates so the $G_{Ip}$ is lower than the $G_{Ic}$. Such decrease in energy is attributed by those skilled in the art to an unstable crack growth, which results in premature failure of the composite parts. A $G_{Ip}$ that is significantly lower than $G_{Ic}$ would be catastrophic if this occurs as consequence of fatigue loads applied on a structural co-bonded composite component and would result in a premature failure of the component.

Conventional insoluble thermoplastic particles have been found to be effective as interlaminar tougheners because they can provide good $G_{Ic}$ value, but as soon as the crack propagates due to applied energy on the part overcoming the $G_{Ic}$ value, the energy required for delamination propagation decreases or remain constant, i.e., $G_{Ip}$ is lower or equal to $G_{Ic}$.

Disclosed herein is a composite laminate containing interlaminar toughening particles that can provide good fatigue resistance, i.e., the composite material become more resistant to crack propagation as soon as the crack start propagating. The composite laminate is composed of at least two layers of resin-impregnated reinforcement fibers and toughening particles at the interlaminar region between adjacent layers of resin-impregnated reinforcement fibers. The layers of reinforcement fibers are impregnated with a thermoset resin, which is thermally curable at elevated temperatures. The toughening particles include soluble thermoplastic polyimide particles, which are solids in a thermoset resin matrix before curing thereof, but become fully dissolved into the resin matrix during curing at elevated temperatures. In a preferred embodiment, a combination of soluble thermoplastic polyimide particles and insoluble thermoplastic particles are present at the interlaminar region. The total amount of toughening particles in the composite laminate may be up to 6% (in weight percentage), preferably, in the range of 2.5% to 5%, of the total weight of composite laminate. The amount of soluble thermoplastic polyimide particles in the composite laminate is no more than 2.5% (in weight percentage), preferably, 0.5% to 2%, of the total weight of composite laminate.

Figure 2:
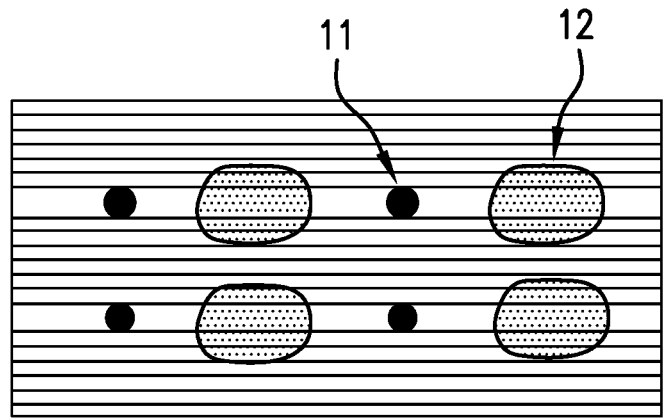
FIG. 2 schematically illustrates the composite laminate of FIG. 1 after curing.

FIG. 1 schematically illustrates a composite laminate 10 containing insoluble particles 11 and soluble polyimide particles 12 at the interlaminar regions (13, 13') before curing. Each interlaminar region is formed between adjacent layers of resin-impregnated fibers (hereafter referred as "fiber layers"). The particles are embedded in a resin matrix that is the same as or different from the resin impregnating the fiber layers. FIG. 2 schematically illustrates the same composite laminate after curing and the effect of the soluble thermoplastic particles. The soluble thermoplastic particles have fully dissolved into the surrounding thermoset matrix during the curing cycle of the composite laminate, creating the thermoplastic diffused regions 12 shown in FIG. 2.

Figure 3:
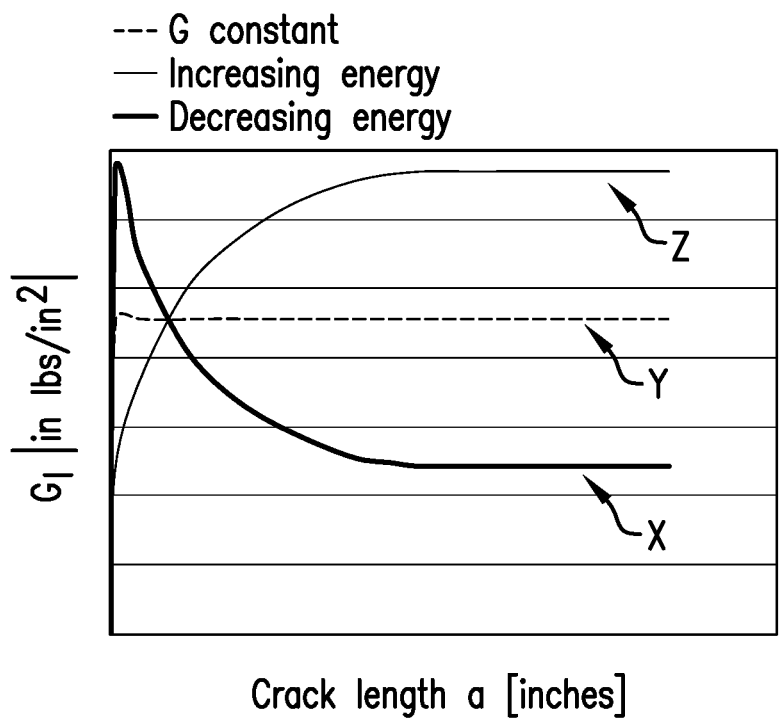
FIG. 3 is a graph showing $G_I$ versus crack length for different scenarios.

Upon curing of the composite laminate disclosed herein, the resulting cured composite exhibits an interlaminar fracture toughness that increases as a function of the delamination propagation under mode I. It has been discovered that the presence of soluble thermoplastic polyimide particles and insoluble particles at the laminar regions resulted in $G_{Ip}$ being higher than the $G_{Ic}$. This effect is not expected since conventional composite materials usually do not show an interlaminar fracture toughness that increases as a function of the delamination propagation. In some embodiments, the cured composite can provide a delamination propagation resistance under mode I (or $G_{Ip}$) of greater than 2.0 in-lb/in$^2$. FIG. 3 is a schematization of different cases in which the dissipated energy decreases (curve X), remains constant (curve Y), or increases (curve Z) as a function of the crack length. Curves X and Y represent conventional materials, and curve Z represents the improved composite laminate of the present disclosure where $G_{Ip}$ is higher than the $G_{Ic}$.

Soluble Thermoplastic Polyimide Particles

For the purpose disclosed herein, the soluble thermoplastic polyimide particles are particles of an amorphous polyimide with high glass transition temperature (Tg) in the range of 180° C. to 340° C., preferably, 220° C. to 300° C., as determined by Differential Scanning calorimetry (DSC). The particle size of the polyimide particles may be in the range of 10 to 100 μm (microns). Such polyimide particles remain in solid form, as discrete particles, at low temperatures, more specifically, temperatures below 75° C., and will not dissolve in a thermoset resin such as epoxy or bismaleimide (BMI) at such low temperatures. Thus, the polyimide particles can be mixed with one or more thermoset resins and other components such as curing agents (or hardeners) at a temperature below 75° C. to form a thermoset resin composition containing discrete polyimide particles. Upon curing of the thermoset resin composition in the temperature range of from 140° C. to 220° C., such polyimide particles fully dissolve in the resin composition.

The thermoset resin composition suitable for fabricating the composite laminate contains soluble thermoplastic polyimide particles in an amount of up to 6% (in weight percentage), preferably, 2%-5%, based on the total weight of the thermoset resin composition. Above 6% of soluble polyimide particles is not desirable for the purpose herein.

Suitable polyimides are those formed by condensing an aromatic dianhydride with an aromatic diamine containing an aliphatic or cycloaliphatic structure.

In one embodiment, the polyimide is a reaction product of 3,3',4,4'-benzophenone tetracarboxylic dianhydride (BTDA) and 5(6)-amino-1-(4'-aminophenyl)-1,3,3'-trimethylindane (DAPI). The asymmetry of the DAPI diamine prevents crystallization of the polyimide and thus ensures a suitable dissolution upon curing. Other polyimides based on the condensation of BTDA with sufficiently asymmetric diamines to prevent crystallization of the polyimides are also suitable.

Also suitable are polyimides derived from other dianhydrides, including, but not limited to, 3,3',4,4'-diphenylsulfonetetra carboxylic dianhydride (DSDA), 3,3',4,4'-biphenyltetracarboxylic dianhydride (BPDA), 4,4'-Oxydiphthalic anhydride (ODPA), 1,5-naphthalene diamine (NAPDA), and 3,4-dicarboxyphenylhexafluoropropane dianhydride (6FDA). As examples, the reaction product of 3,4-dicarboxyphenylhexa fluoropropane dianhydride (6FDA) with 1,3-Bis(3-aminophenoxy) benzene (APB) and the reaction product of 3,4-dicarboxyphenylhexa fluoropropane dianhydride (6FDA) with 2,2'-bis[4-(4-aminophenoxy)-phenyl]propane (BAPP) are known to have good solubility in epoxy.

The term "amorphous" refers to a non-crystalline solid that lacks the long-range order characteristic of a crystal. A crystalline solid has a sharp melting point, i.e., it changes into the liquid state at a definite temperature, which is easily identified using a technique such as Differential Scanning calorimetry (DSC). On the contrary, an amorphous solid does not have a sharp melting point. Rather, the amorphous solid has a softening or glass transition temperature at which it softens upon heating and starts to flow without undergoing any abrupt or sharp change from solid to liquid phase.

"Curing" or "cure" in this disclosure refers to the hardening of a polymeric material by the chemical cross-linking of the polymer chains. The term "curable" means that the composition is capable of being subjected to conditions which will render the composition to a hardened or thermoset state.

"Discrete particle" as used herein refers to a particle which is discernible in a resin matrix, and which may be detected by using Scanning Electron Microscopy (SEM), Optical Microscopy, or Differential Interference Contrast microscopy (DIC).

"Fully dissolved" in reference to soluble particles means the entire particle has dissolved and no discernable particle remains.

"Resin matrix" refers to a mass of resin material. "Embedded in a resin matrix" means firmly fixed or positioned within a surrounding mass.

In the present disclosure, particle size can be determined by dynamic light scattering, using, for example, a Malvern Zetasizer 2000.

Determining whether certain particles are insoluble or soluble relates to the solubility in a particular resin system in which they reside. Hot stage microscopy can be used to determine if a particle is insoluble or soluble in a resin matrix. First, a sample of dry particles (i.e., not combined with a resin) is measured to determine the average particle size and volume. Second, a sample of particles is dispersed, at particle loading of 1%-10% by weight, in a resin composition containing no curative or catalyst via mechanical mixing. Third, a sample of the resulting mixture is placed on a microscope slide which is then placed in a hot stage setup under a microscope. Then, the sample is heated to a cure temperature, and any change in size, volume or shape of the particles is observed and measured.

When particles are subjected to the above hot stage microscopy analysis and the change in diameter or volume of the particle is zero or less than 5%, as compared to the original "dry" particles, then the particle is considered to be insoluble. If the particles fully dissolved and are no longer discernable as discrete particles after cooling, the particles are considered soluble.

Insoluble Thermoplastic Particles

The insoluble thermoplastic particles do not dissolve during the curing process of the composite laminate and remain within the interlaminar regions of the cured composite. Generally, the insoluble thermoplastic particles do not dissolve in epoxy resins at a temperature of less than 190° C. Particles made of crystalline or semi-crystalline, i.e., non-amorphous, thermoplastic polymers having a melting temperature of greater than 180° C., are suitable for the purposes herein. In some embodiments, the insoluble thermoplastic particles have a melting temperature of greater than 200° C. Such melting temperature refers to the endothermic melting peak present in the Differential Scanning calorimetry (DSC) thermogram. A semi-crystalline or crystalline polymer is defined herein as one exhibiting a degree of crystallinity of at least 5%, preferably at least 10%, as measured using (DSC).

Suitable insoluble thermoplastic particles include particles of polyamideimide (PAI) and polyamide (PA) (e.g. nylon), and polyphthalamide (PPA), which are insoluble in epoxy resins during the curing cycle in the temperature range of 150° C. to 200° C. Other examples of insoluble thermoplastic particles include particles of polyaryletherketones (PAEK), such as polyetheretherketone (PEEK) and polyetherketoneketone (PEKK), which have melting temperature of 300° C. or higher, e.g. 300° C.-360° C. Other examples include particles of polyphenylene sulfide (PPS), liquid crystal polymers (LCPs). Copolymers and derivatives of the aforementioned polymers are also possible.

The insoluble thermoplastic particles suitable for the purposes herein include cross-linked thermoplastic particles. The crosslinked particles may be formed from as a blend of thermoplastic polymers. According to one embodiment, the cross-linked thermoplastic particle is composed of a cross-linking network created by reacting one or more crosslinkable thermoplastic polymers having one or more reactive groups with a crosslinking agent that is chemically reactive to the reactive groups, wherein the crosslinking agent directly crosslinks the polymer chains to each other via the reactive groups. The reactive groups may be end groups or pendant groups on the polymer backbone. The direct crosslinking reaction of this embodiment may be described as "tying-up" the polymer molecules via direct crosslinking of the polymer chains using one or more reactive groups.

Examples of suitable thermoplastic polymers bearing reactive groups that are susceptible to crosslinking include, but are not limited to, one or more of a polyether, polycarbonate, polyetherimide (PEI), polyamide, polyimide, polysulfone, polyethersulfone (PES), poly phenylene oxide (PPO), poly ether ketones, polyaryletherketones (PAEK) such as polyetheretherketone (PEEK) and polyetherketoneketone (PEKK), polyphenyl sulfides (PPS), polyhydroxyethers, styrene-butadiene, polyacrylates, polyacetol, polybutyleneterephthalate, polyamide-imide, polyetherethersulfone (PEES), blends thereof, or a copolymer thereof, PES homopolymers (such as SUMIKAEXCEL 5003P from Sumitomo Chemical Co. or Rader) PES from Solvay), or PEES homopolymers.

The cross-linked thermoplastic particles include swellable particles. These swellable cross-linked thermoplastic particles become swollen in an epoxy-based resin system during curing, but remain as discreet particles in the cured resin. The swollen particle exhibits an increase in the diameter or volume of the particle. The swelling is caused by the infusion of the surrounding resin into the outer surface of the particle. These swellable, cross-linked thermoplastic particles also form a "gradient interface" with the surrounding matrix resin in which they reside during curing. The term "gradient interface" as used herein refers to the gradual and strong interface between each of the particles and the surrounding matrix resin. A gradient interface is achieved by using engineered crosslinked thermoplastic particles that are thermodynamically compatible with the thermoset resin, e.g. epoxy. The concentration of thermoplastic polymer in the core of a cross-linked thermoplastic particle is greatest at the center and gradually decreases towards the outer surface of the particle as the matrix resin enters the particle from the outer surface and moves towards the core. This gradual decrease in the thermoplastic concentration from the core to the outer surface of the thermoplastic particle forms the gradient interface between each of the thermoplastic particles and the surrounding matrix resin. Thus, there is no sharp delineation or transition between the thermosetting resin and the thermoplastic particle. If a sharp delineation or transition was present, the interface between the thermoplastic and the thermosetting resin would be much weaker in a composite material in comparison to a composite material containing a gradient interface. As such, these crosslinked thermoplastic particles are considered "swellable" because the resin, which surrounds the particle, diffuses into the particles through the particle's outer surface when the resin is heated and its viscosity is reduced, thereby resulting in an increase in the particle size. However, the crosslinked particles will remain as discrete and discernable particles after curing of the resin. Such swellable crosslinked thermoplastic particles may be produced by the process as described in U.S. Patent Application with Publication No. 2010/0304118, published on Dec. 2, 2010, which is incorporated herein by reference.

The cross-linked thermoplastic particles described herein are discreet, free-moving particles (i.e. in divided state) that may be added to a thermoset resin, such as an epoxy resin, and they are chemically cross-linked in order to prevent their total dissolution in the resin during the cure cycle of the resin. Furthermore, they are designed to be thermodynamically compatible with the thermoset resin.

Certain grades of polyimide particles are also suitable as insoluble thermoplastic particles. For example, polyimides prepared from benzophenone tetracarboxylic acid dianhydride (BTDA), 4,4'-methylenedianiline (MDA), and 2,4-toluenediamine (TDA), and having a non-phthalimide carbon content which contains between 90% and 92% aromatic carbons.

Curable Thermoset Resin Composition

The curable thermoset resin composition for impregnating/infusing the reinforcement fibers is preferably a hardenable or thermosettable resin containing one or more uncured thermoset resins, which include, but are not limited to, epoxy resins, bismaleimide, vinyl ester resins, cyanate ester resins, isocyanate modified epoxy resins, phenolic resins, furanic resins, benzoxazines, formaldehyde condensate resins (such as with urea, melamine or phenol), polyesters, acrylics, hybrids, blends and combinations thereof. Upon thermal curing by heat application, the thermoset resin composition undergoes crosslinking and becomes irreversibly harden, resulting in a hardened material that can no longer be reshaped by thermoforming (a process that includes heating a material and shaping the thus heated material so as to obtain the desired shaped object).

In preferred embodiments, the thermoset resin composition contains one or more epoxy resins and one or more curing agents and/or catalyst(s).

Suitable epoxy resins include polyglycidyl derivatives of aromatic diamine, aromatic mono primary amines, amino-phenols, polyhydric phenols, polyhydric alcohols, polycarboxylic acids. Examples of suitable epoxy resins include polyglycidyl ethers of the bisphenols such as bisphenol A, bisphenol F, bisphenol S and bisphenol K; and polyglycidyl ethers of cresol and phenol based novolacs.

Specific examples are tetraglycidyl derivatives of 4,4'-diaminodiphenylmethane (TGDDM), resorcinol diglycidyl ether, triglycidyl-p-aminophenol, triglycidyl-m-aminophenol, bromobisphenol F diglycidyl ether, tetraglycidyl derivatives of diaminodiphenylmethane, trihydroxyphenyl methane triglycidyl ether, polyglycidylether of phenol-formaldehyde novolac, polyglycidylether of o-cresol novolac or tetraglycidyl ether of tetraphenylethane.

Commercially available epoxy resins suitable for use in the host matrix resin include N,N,N',N'-tetraglycidyl diamino diphenylmethane (e.g. MY 9663, MY 720, and MY 721 from Huntsman); N,N,N',N'-tetraglycidyl-bis(4-aminophenyl)-1,4-diiso-propylbenzene (e.g., EPON 1071 from Momentive); N,N,N',N'-tetraclycidyl-bis(4-amino-3,5-dimethylphenyl)-1,4-diisopropylbenzene, (e.g. EPON 1072 from Momentive); triglycidyl ethers of p-aminophenol (e.g. MY 0510 from Hunstman); triglycidyl ethers of m-aminophenol (e.g., MY 0610 from Hunstman); diglycidyl ethers of bisphenol A based materials such as 2,2-bis(4,4'-dihydroxy phenyl) propane (e.g. DER 661 from Dow, or EPON 828 from Momentive, and Novolac resins preferably of viscosity 8-20 Pa·s at 25° C.; glycidyl ethers of phenol Novolac resins (e.g. DEN 431 or DEN 438 from Dow); di-cyclopentadiene-based phenolic novolac (e.g., Tactix® 556 from Huntsman); diglycidyl 1,2-phthalate (e.g., GLY CEL A-100); diglycidyl derivative of dihydroxy diphenyl methane (Bisphenol F) (e.g., PY 306 from Huntsman). Other epoxy resins include cycloaliphatics such as 3',4'-epoxycyclohexyl-3,4-epoxycyclohexane carboxylate (e.g., CY 179 from Huntsman).

The addition of curing agent(s) and/or catalyst(s) in the curable matrix resin is optional, but the use of such may increase the cure rate and/or reduce the cure temperatures, if desired. The curing agent is suitably selected from known curing agents, for example, aromatic or aliphatic amines, or guanidine derivatives. An aromatic amine curing agent is preferred, preferably an aromatic amine having at least two amino groups per molecule, and particularly preferable are diaminodiphenyl sulphones, for instance where the amino groups are in the meta- or in the para-positions with respect to the sulphone group. Particular examples are 3,3'- and 4-,4'-diaminodiphenylsulphone (DDS); methylenedianiline; bis(4-amino-3,5-dimethylphenyl)-1,4-diisopropylbenzene; bis(4-aminophenyl)-1,4-diisopropylbenzene; 4,4'methylenebis-(2,6-diethyl)-aniline (MDEA from Lonza); 4,4'methylenebis-(3-chloro, 2,6-diethyl)-aniline (MCDEA from Lonza); 4,4'methylenebis-(2,6-diisopropyl)-aniline (M-DIPA from Lonza); 3,5-diethyl toluene-2,4/2,6-diamine (D-ETDA 80 from Lonza); 4,4'methylenebis-(2-isopropyl-6-methyl)-aniline (M-MIPA from Lonza); 4-chlorophenyl-N,N-dimethyl-urea (e.g., Monuron); 3,4-dichlorophenyl-N, N-dimethyl-urea (e.g. DIURON™) and dicyanodiamide (e.g., AMICURE™ CG 1200 from Pacific Anchor Chemical).

Suitable curing agents also include anhydrides, particularly polycarboxylic anhydrides, such as nadic anhydride, methylnadic anhydride, phthalic anhydride, tetrahydrophthalic anhydride, hexahydrophthalic anhydride, methyltetrahydrophthalic anhydride, endomethylenetetrahydrophtalic anhydride, and trimellitic anhydride.

The curable thermoset resin composition may contain other additives such as co-monomers, rheology control agents, tackifiers, inorganic or organic fillers, thermoplastic and/or elastomeric polymers as toughening agents, stabilizers, inhibitors, pigments, dyes, flame retardants, reactive diluents, and other additives well known to those skilled in the art for modifying the properties of the matrix resin before or after curing.

Suitable toughening agents for the curable resin composition include but are not limited to homopolymers or copolymers either alone or in combination of polyamides, copolyamides, polyimides, aramids, polyketones, polyetherimides (PEI), polyetherketones (PEK), polyetherketoneketone (PEKK), polyetheretherketones (PEEK), polyethersulfones (PES), polyetherethersulfones (PEES), polyesters, polyurethanes, polysulphones, polysulphides, polyphenylene oxide (PPO) and modified PPO, poly(ethylene oxide) (PEO) and polypropylene oxide, polystyrenes, polybutadienes, polyacrylates, polymethacrylates, polyacrylics, polyphenylsulfone, high performance hydrocarbon polymers, liquid crystal polymers, elastomers and segmented elastomers. If present, the total amount of toughening agent (s) in the resin composition is less than 25% (in weight percentage) based on the total weight of the resin composition.

Reinforcement Fibers

For fabricating high-performance composite materials and prepregs, suitable reinforcing fibres are but not limited to fibers having a high tensile strength, preferably greater than 500 ksi (or 3447 MPa). Fibers that are useful for this purpose include carbon or graphite fibres, glass fibres and fibres formed of silicon carbide, alumina, boron, quartz, and the like, as well as fibres formed from organic polymers such as for example aramid (e.g., Kevlar), polyolefins, poly (benzothiazole), poly(benzimidazole), polyarylates, poly (benzoxazole), aromatic polyamides, polyaryl ethers and the like, and may include mixtures having two or more such fibres. The reinforcement fibers may be in the form of continuous tows, each tow made up of multiple filaments, unidirectional or multidirectional fibers, tapes of unidirectional fibers, or nonwoven or woven fabrics.

Manufacturing of Composite Prepreg and Laminates

To fabricate a composite prepreg, the toughening particles as blend of soluble polyimide particles and insoluble thermoplastic particles, are mixed with the curable thermoset resin composition prior to impregnation of reinforcement fibers with such resin composition. The mixing temperature is below the dissolution temperature of the polyimide particles, for example, below 75° C. Preferably, the particles are uniformly dispersed in the resin composition. For film impregnation, a resin film is prepared first by coating the particle-containing resin composition onto a release paper. Next, one or two of such resin film is/are laminated onto one or both sides of a layer of reinforcement fibers under the aid of heat and pressure to impregnate the fibers, thereby forming a fiber-reinforced resin layer (or prepreg ply) with specific fiber areal weight and resin content. During the laminating process, the toughening particles are filtered out and remain external to the fiber layer due to the fact that the size of the particles is larger than the spacing between the fiber filaments in the fiber layer, and the lamination process is performed at a temperature and for a time that do not cause the dissolution of the polyimide particles. Such lamination/ processing temperature is preferably below 95° C.

The resulting prepreg ply contains a structural resin-impregnated fiber layer with toughening particles positioned adjacent to one or both sides of the fiber layer, depending on whether one or two particle-containing resin films are used. In some embodiments, the reinforcement fibers in a prepreg ply constitutes from 30% to 70%, preferably from 50 to 70%, by volume of the prepreg ply.

Subsequently, when two or more prepreg plies containing toughening particles therein are laid up, one on top of another other in a stacking arrangement, via a laying up process, the toughening particles are positioned in the interlaminar region between two adjacent fiber layers. In this embodiment, the matrix resin at the interlaminar region (without particles) is the same as the matrix resin contained in the structural resin-impregnated fiber layer. Upon curing the polyimide particles dissolve in the matrix resin creating a region with high properties of delamination propagation resistance.

In a second embodiment, the prepreg may contain also insoluble thermoplastic particles, which are mixed with the curable resin composition prior to impregnation of reinforcement fibers (i.e. prior to the prepreg manufacturing) together with the soluble polyimide particles.

In a third embodiment, up to four resin films may be manufactured with different contents of particles and are laminated onto both sides of a layer of reinforcement fibers under the aid of heat and pressure to impregnate the fibers, thereby forming a prepreg similar to the ones above.

In the present disclosure, the term "prepreg" as refers to a layer of fibrous material (in the form unidirectional fibers, nonwoven mat, or fabric ply) that has been impregnated or infused with a curable matrix resin. The term "impregnate" as used in this disclosure refers to the introduction of a curable resin to reinforcement fibers so as to partially or fully encapsulate the fibers with the matrix resin.

To form a composite structure, a plurality of prepreg plies may be laid up on a tool in a stacking sequence to form a "prepreg lay-up." Prepreg lay-ups may be manufactured by techniques that may include, but are not limited to, hand lay-up, automated tape layup (ATL), advanced fibre placement (AFP), and filament winding. For ATL, AFP and filament winding, the prepregs are in the form of narrow-width continuous tapes.

Curing of the composite material or prepreg layup disclosed herein may be carried out at elevated temperature up to 200° C., preferably in the range of 170° C.-190° C., and with use of elevated pressure to restrain deforming effects of escaping gases, or to restrain void formation, suitably at pressure of up to 10 bar (1 MPa), preferably in the range of 3 bar (0.3 MPa) to 7 bar (0.7 MPa).

EXAMPLES

Example 1

Combination of Insoluble and Soluble Polyimide Particles

Two resin compositions (Control 1.0, Resin 1.1) were prepared based on the formulations shown in Table 1. Resin 1.1 is similar to Control Resin 1.0 except that 5% w/w of the insoluble particles P84 was substituted with 5% w/w of soluble Matrimid® 9725. Amounts are reported in weight by weight (w/w) percentage in Table 1.

TABLE 1

Resin Compositions.

| | Control 1.0 | Resin 1.1 |
|---|---|---|
| Araldite ® PY306 | 26.1 | 26.1 |
| Araldite ® MY0510 | 26.1 | 26.1 |
| SUMIKAEXCEL 5003P | 10.0 | 10.0 |
| 4,4' DDS | 27.8 | 27.8 |
| P84 | 10.0 | 5.0 |
| Matrimid ® ® 9725 | — | 5.0 |

P84 is an aromatic polyimide with a glass transition temperature of approximately 340° C. and a mean particle size of 44 microns, supplied by HP Polymers. 4,4' DDS refers to 4,4'-dichlorodiphenyl sulfone, a curing agent.

SUMIKAEXCEL 5003P was used as a toughening agent and is a polyphenylsulfone with a glass transition temperature of 225° C., available from Sumitomo. SUMIKAEXCEL 5003P was combined with the epoxy mixture (Araldite® PY306 and Araldite® MY0510) at a temperature below 70° C. and then fully dissolved at about 125° C. The mixture was cooled to about 75° C., and the P84 particles and curing agent were added to the epoxy mixture.

Matrimid® 9725 (polyimide) particles are based on a diamine, 5(6)-amino-1-(4' aminophenyl)-1,3,-trimethylindane, available from Huntsmann. Matrimid® 9725 particles in the Resin 1.1 were added as the last component to the epoxy mixture at a temperature below 75° C. and they remained undissolved at this temperature for the duration of the mixing.

The two resin compositions (Control 1.0, Resin 1.1) were used for manufacturing unidirectional (UD) prepregs labeled respectively as Prepreg 2.0 and Prepreg 2.1, using film impregnation process. For each resin composition, two resin films were produced by coating the resin composition onto a release paper. Next, two of such resin films were laminated onto both sides of a continuous layer of unidirectional carbon fibers (IM65 E23-24K-830dtex from Toho Tenax, USA), under the aid of heat and pressure, forming prepregs having a fiber areal weight (FAW) of 190 gsm and a resin content of 34% w/w.

Cured test coupons (Control Panel 2.0 and Comparative Panel 2.1) were prepared from the prepregs (Prepreg 2.0 and Prepreg 2.1, respectively) for the mechanical tests described below. Curing occurred in an autoclave at 180° C. for 2 hours under a pressure of 6 bar. Such curing cycle provides full dissolution of Matrimid® 9725 (polyimide) particles.

The interlaminar fracture toughness test results are shown in Table 2. In Table 2, "ILP" refers to interlaminar particles.

TABLE 2

Comparative Interlaminar fracture toughness test results.

| | Resin composition | Prepreg | ILP | Total % of ILP | $G_{Ic}$ (in-lb/in$^2$) | $G_{Ip}$ (in-lb/in$^2$) |
|---|---|---|---|---|---|---|
| Control Panel 2.0 | 1.0 | 2.0 | P84 | 10 | 1.68 | 1.72 |
| Comparative Panel 2.1 | 1.1 | 2.1 | P84 + Matrimid ® 9725 | 10 | 1.67 | 2.41 |

The results show that the use of insoluble P84 particles only provide a stable $G_I$ value equal to about 1.7 in-lb/in$^2$ as a function of the delamination growth, and $G_{Ip}$ average value is similar to $G_{Ic}$. In contrast, it was found that when 50% of P84 particles was replaced with the same amount of Matrimid®®9725 particles in the comparative Panel 2.1, $G_{Ip}$ value increased to 2.41 in-lb/in$^2$, which is more than 30% of improvement comparing to the delamination propagation value of the Control panel 2.0 having the same amount of particles in the total resin composition. The total amount of interlaminar particles in both Resin compositions 1.0 and 1.1 was 10% w/w.

Example 2

Combination of Insoluble Semi-Cycloaliphatic Polyamide and Soluble Polyimide Particles Two resin compositions (Control 1.2 and Resin 1.3) were prepared based on the formulations shown in Table 3. Resin 1.3 differs from Control 1.2 in that 5% w/w of the insoluble particles MSP-CX was substituted with 5% w/w of Matrimid® 9725. Amounts in Table 3 are reported in weight by weight (w/w) percentage.

TABLE 3

Resin Compositions

|  | Control 1.2 (in-lb/in$^2$) | Resin 1.3 (in-lb/in$^2$) |
|---|---|---|
| Araldite ® PY306 | 26.1 | 26.1 |
| Araldite ® MY0510 | 26.1 | 26.1 |
| SUMIKAEXCEL 5003P | 10.0 | 10.0 |
| 4,4' DDS | 27.8 | 27.8 |
| MSP-CX | 10.0 | 5.0 |
| Matrimid ® 9725 | — | 5.0 |

Daiamid® MSP-CX refers to particles of semi-cycloaliphatic polyamide having an average particle size of 16.9 microns, supplied by Evonik Industries.

The epoxy mixture containing Araldite® PY306, Araldite® MY0510 and SUMIKAEXCEL 5003P was prepared as in Example 1. The epoxy mixture was cooled to about 75° C., and then the Daiamid® MSP-CX particles and the 4,4'DDS curing agent were added to the epoxy mixture. Matrimid® 9725 (polyimide) particles in the Resin 1.3 were added as the last component to the epoxy mixture at a temperature below 75° C., and they remained undissolved at this temperature for the duration of the mixing.

The resin compositions (Control 1.2 and Resin 1.3) were used for manufacturing unidirectional (UD) prepregs labeled as Prepreg 2.2 and Prepreg 2.3 respectively, using film impregnation process. The prepregs were manufactured as described in Example 1, impregnating unidirectional carbon fibers (IM65 E23-24K-830dtex from Toho Tenax, USA), under the aid of heat and pressure, forming prepregs having a FAW of 190 gsm and a resin content of 34% w/w.

Cured test coupons (Control Panel 2.2 and Comparative Panel 2.3) were prepared from Prepreg 2.2 and Prepreg 2.3, respectively, for mechanical tests described below. Curing occurred in an autoclave at 180° C. for 2 hours under a pressure of 6 bar. Such curing cycle provided full dissolution of Matrimid® 9725 (polyimide) particles.

The interlaminar fracture toughness test results are shown in Table 4.

TABLE 4

Comparative Interlaminar fracture toughness test results

|  | Resin composition | Prepreg | ILP | Total % of ILP | $G_{Ic}$ (in-lb/in$^2$) | $G_{Ip}$ (in-lb/in$^2$) |
|---|---|---|---|---|---|---|
| Control Panel 2.2 | 1.2 | 2.2 | MSP-CX | 10 | 2.02 | 1.97 |
| Comparative Panel 2.3 | 1.3 | 2.3 | MSP-CX + Matrimid ® 9725 | 10 | 1.78 | 2.33 |

The results show that the use of insoluble Daiamid® MSP-CX particles provided a stable GI value equal to about 2.0 in-lb/in$^2$ as a function of the delamination growth, and $G_{Ip}$ average value was similar to $G_{Ic}$.

In contrast, when 50% of Daiamid® particles was replaced with the same amount of Matrimid® 9725 particles in the Comparative Panel 2.3, $G_1$ value was increased to 2.33 in-lb/in$^2$ which is more than 15% of an improvement comparing to the delamination propagation value of the Control panel 2.2 having the same amount of particles in the total resin composition.

Example 3

Combination of Insoluble Semi-Aromatic Polyamide and Soluble Polyimide Particles Two resin compositions (Control 1.4 and Resin 1.5) were prepared based on the formulations shown in Table 5. Resin 1.5 differed from Control 1.4 in that 5% w/w of the insoluble particles Daiamid® MSP A7043 was substituted with 5% w/w of Matrimid® 9725. Amounts in Table 5 are reported in weight by weight (w/w) percentage.

TABLE 5

Resin Compositions

|  | Control 1.4 | Resin 1.5 |
|---|---|---|
| Araldite ® PY306 | 26.1 | 26.1 |
| Araldite ® MY0510 | 26.1 | 26.1 |
| SUMIKAEXCEL 5003P | 10.0 | 10.0 |
| 4,4' DDS | 27.8 | 27.8 |
| MSP A7043 | 10.0 | 5.0 |
| Matrimid ® 9725 | — | 5.0 |

Daiamid® MSP-A7043 refers to particles of semi-aromatic polyamide having an average particle size of 15.8 microns, supplied by Evonik Industries.

The epoxy mixture containing Araldite® PY306, Araldite® MY0510 and SUMIKAEXCEL 5003P was prepared as in Example 1. The epoxy mixture was cooled to about 75° C., and then the Daiamid® MSP-A7043 particles and the curing agent 4,4'DDS were added to the epoxy mixture. Matrimid® 9725 (polyimide) particles in the Resin 1.5 were added as the last component to the epoxy mixture at a temperature below 75° C. and they remained undissolved at this temperature for the duration of the mixing.

The resin compositions (Control 1.4 and Resin 1.5) were used for manufacturing unidirectional (UD) prepregs (Prepreg 2.4 and Prepreg 2.5, respectively) using film impregnation process. The prepregs were manufactured as described for Examples 1 and 2, impregnating unidirectional carbon fibers (IM65 E23-24K-830dtex from Toho Tenax, USA), under the aid of heat and pressure, forming prepregs having a FAW of 190 gsm and a resin content of 34% w/w.

Cured test coupons (Control Panel 2.4 and Comparative Panel 2.5) were prepared from the prepregs (Prepreg 2.4 and Prepreg 2.5) for mechanical tests described below. Curing occurred in an autoclave at 180° C. for 2 hours under a pressure of 6 bar. Such curing cycle provided full dissolution of Matrimid® 9725 (polyimide) particles.

The interlaminar fracture toughness test results are shown in Table 6.

TABLE 6

Comparative Interlaminar fracture toughness test results.

| | Resin composition | Prepreg | ILP | Total % of ILP | $G_{I c}$ (in-lb/in²) | $G_{I p}$ (in-lb/in²) |
|---|---|---|---|---|---|---|
| Control Panel 2.4 | 1.4 | 2.4 | MSP A7043 | 10 | 2.44 | 2.48 |
| Comparative Panel 2.5 | 1.5 | 2.5 | MSP A7043 + Matrimid® 9725 | 10 | 2.14 | 2.85 |

The results show that the use of insoluble Daiamid® MSP A7043 particles also provided a stable $G_I$ value equal to 2.4-2.5 in-lb/in² as a function of the delamination growth, and $G_{Ip}$ average value was similar to $G_{Ic}$.

In contrast, when 50% of MSP A7043 particles was replaced with the same amount of Matrimid® 9725 particles in Comparative Panel 2.5, the $G_{Ip}$ value was increased to 2.85 in-lb/in², which is about 15% of an improvement comparing to the delamination propagation value of the Control panel 2.4 having the same amount of particles in the total resin composition.

Example 4

Additional Mechanical Test Results

Additional panels were manufactured from the prepregs prepared in Examples 1-3, Prepregs 2.1, 2.3 and 2.5. Mechanical test results generated from Prepregs 2.1, 2.3 and 2.5, which contained soluble polyimide, are reported in Table 7.

TABLE 7

Mechanical test results.

| | Prepreg batch | ILP | Total % of ILP | CAI (270 in-lb), ksi | $G_{IIC}$ 2% (ENF), in-lb/in² | ILSS, ksi |
|---|---|---|---|---|---|---|
| Comparative Panel 3.1 | 2.1 | P84 + Matrimid® 9725 | 10 | 37.3 | 8.6 | 15.9 |
| Comparative Panel 3.3 | 2.3 | MSP-CX + Matrimid® 9725 | 10 | 42.4 | 9.8 | 15.2 |
| Comparative Panel 3.5 | 2.5 | MSP A7043 + Matrimid® 9725 | 10 | 36.1 | 8.1 | 16.6 |

The results show that the use of Matrimid® 9725 (soluble polyimide) in combination with other insoluble particles provided excellent mechanical test results in terms of CAI, $G_{IIc}$ and ILSS, showing the applicability to aircraft primary structures and to other transportation applications with high load bearing capabilities.

Test Procedures $G_I$ Testing Procedure

Inter-laminar fracture toughness was measured in inch-pound per square inches (in-lb/in²) on double-cantilevered beam (DCB) coupons as described in ASTM D5528. The DCB specimen was used to determine two values of the Mode I interlaminar fracture toughness: $G_{IC}$, the growth initiation value and $G_{IP}$, an average propagation value.

A lay-up containing 26 prepreg plies was used to manufacture coupon of 10" in length by 1" in width. A release film was placed at on edge of the coupon in the mid plane to create a 2.5" in length delamination crack starter. Plies on either side of this non-stick insert were oriented at +2° and −2° to the longitudinal axis of the specimen.

The DCB coupons were then loaded in tension until delamination growth. The inter-laminar fracture toughness in mode I ($G_{Ic}$) is the critical value of the strain energy release rate (G) associated with the onset of delamination growth in mode I. The values of $G_{Ic}$ were calculated according to the modified beam theory by using Equation 1, where $F_{max}$ is the maximum recorded load bat the onset of delamination growth, w is the coupon width, and $\partial C/\partial \alpha$ is the partial derivative of the coupon compliance ($\partial C$) for an infinitesimal delamination crack growth ($\partial \alpha$).

$$G_{Ic} = (F_{max})^2/(2w)\partial C/\partial \alpha [\text{in-lb/in}^2] \qquad \text{Equation 1}$$

Figure 4:
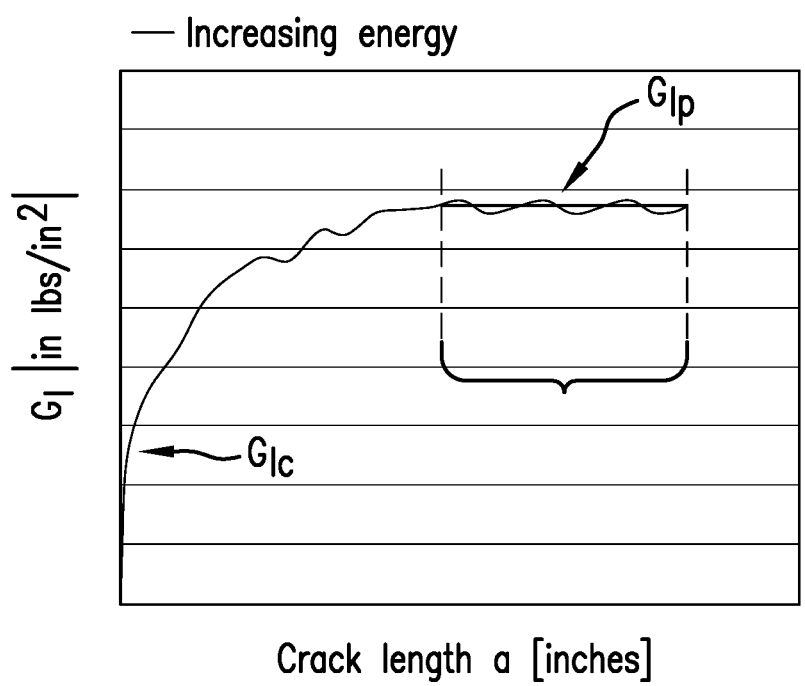
FIG. 4 is an illustration of how $G_{Ip}$ can be determined based on a graph of strain energy release rate (G) under mode I plotted as a function of crack length, which can be generated according to a standard double cantilever beam (DCB) test.

The standard double cantilever beam (DCB) test, e.g. ASTM D5528, is typically used for determining interlaminar fracture toughness in the separation mode $G_I$. The strain energy release rate ($G_I$) derived from the analysis of a laminate sample under DCB test can be recorded and plotted as a function of crack length. The calculated value of $G_I$ may change as the crack extends and as the crack propagates. After certain crack propagation distance, if $G_I$ reaches a stable value, the propagation value of strain energy release rate, $G_{IP}$, is calculated as the average value of $G_I$ in a range of crack lengths between which $G_I$ is relatively constant. "Relatively constant" means that the fluctuation in value is less than 10%. FIG. 4 shows, for illustration purpose, a graph of strain energy release rate ($G_I$) plotted as a function of crack length. Such graph can be generated by using the DCB test described above. In FIG. 4, $G_{Ip}$ is the average value taken from the portion of the graph where $G_I$ is relatively constant. In other words, the propagation value of strain energy release rate, $G_{IP}$, is calculated as the average value of $G_I$ in a range of crack lengths in which this value is relatively constant.

CAI Testing Procedure

CAI tests were performed on 4 inches×6 inches coupons according to ASTM D7136/37. Compression after impact (CAI) after a 270 in-lb impact was determined using 24-ply quasi-isotropic laminates. Measurements were performed at room temperature on coupons extracted from defect free panels prepared in accordance with EN 2565 method B and cured for 2 hours at 180° C.

ILSS Testing Procedure

ILSS was measured at room temperature condition as per ASTM D2344.

$G_{IIc}$

Inter-laminar fracture toughness under mode II was measured in inch-pound per square inches (in-lb/in²) on end-notched flexural (ENF) coupons as described in prEN6034. A uni-directional (UD) layup containing 26 plies was used to manufacture the coupons and a release film was placed at on edge of the coupon in the mid plane to create a 2.5" in length delamination crack starter. Plies on either side of this non-stick insert were oriented at +2° and −2° to the longitudinal axis of the specimen.

What is claimed is:

1. A curable composite laminate comprising:
    at least two layers of reinforcement fibers impregnated with a first curable matrix resin comprising one or more thermoset resins; and
    an interlaminar region formed between adjacent layers of reinforcement fibers, the interlaminar region comprising soluble polyimide particles and insoluble thermoplastic particles embedded in a second curable matrix resin that is the same as or different from the first curable matrix resin in composition,
    wherein
    the soluble polyimide particles are fully dissolvable in the second matrix resin at a curing temperature of the second curable matrix resin and the insoluble thermoplastic particles remain as discrete particles in the interlaminar region at said curing temperature,
    the curing temperature of the first and second curable matrix resins is in the range of 140° C. to 220° C.,
    the soluble polyimide particles are formed from an amorphous polyimide, which is a reaction product of an aromatic dianhydride and an aromatic diamine containing an aliphatic or a cycloaliphatic structure, and
    the polyimide particles are present in an amount of no more than 2.5% by weight.

2. The curable composite laminate of claim 1, wherein the first and second curable matrix resins comprise one or more epoxy resins and a curing agent.

3. The curable composite laminate of claim 1, wherein the first and second curable matrix resins comprise bismaleimide.

4. The curable composite laminate according to claim 1, wherein the total amount of all particles at the interlaminar region is up to 6% by weight, based on the total weight of the composite laminate.

5. The curable composite laminate according to claim 1, wherein the amorphous polyimide is a reaction product of benzophenone tetracarboxylic acid dianhydride (BTDA) and 5(6)-amino-1-(4'-aminophenyl)-1,3,3'-trimethylindane (DAPI).

6. The curable composite laminate according to claim 1, wherein the amorphous polyimide has a glass transition temperature ($T_g$) in the range of 180° C. to 340° C., as determined by Differential Scanning calorimetry (DSC).

7. The curable composite laminate according to claim 1, wherein the insoluble thermoplastic particles are particles of crystalline or semi-crystalline thermoplastic polymer having a melting temperature of greater than 180° C. as determined by Differential Scanning calorimetry (DSC).

8. The curable composite laminate according to claim 1, wherein the insoluble thermoplastic particles are particles of a thermoplastic polymer selected from: polyamideimide (PAI) and polyamide (PA), polyphthalamide (PPA), polyaryletherketones (PAEK), polyphenylene sulfide (PPS), liquid crystal polymers (LCPs), copolymers thereof, and derivatives thereof.

9. The curable composite laminate according to claim 1, wherein the soluble polyimide particles and the insoluble thermoplastic particles at the interlaminar region have particles size in the range of 10 to 100 μm (microns) as determined by dynamic light scattering.

10. The curable composite laminate according to claim 1, wherein the soluble polyimide particles and insoluble thermoplastic particles are present only in the interlaminar region.

11. The curable composite laminate according to claim 1, wherein the reinforcement fibers are continuous fibers made of carbon, aramid, or glass.

12. A prepreg comprising a layer of reinforcement fibers impregnated with a curable resin composition, said composition comprising: (a) one or more thermoset resins; (b) soluble polyimide particles that are fully dissolvable in the one or more thermoset resins at a curing temperature of the curable resin composition; and (c) insoluble thermoplastic particles that remain as discrete particles at said curing temperature,
    wherein
    the particles are positioned adjacent to one or both sides of the layer of reinforcement fibers,
    the curing temperature is in the range of 140° C. to 220° C.,
    the soluble polyimide particles are formed from an amorphous polyimide, which is a reaction product of an aromatic dianhydride and an aromatic diamine containing an aliphatic or a cycloaliphatic structure, and
    the soluble polyimide particles are present in an amount of no more than 6% by weight, based on the total weight of the resin composition.

13. The prepreg of claim 12, wherein the amorphous polyimide is a reaction product of benzophenone tetracarboxylic acid dianhydride (BTDA) and 5(6)-amino-1-(4'-aminophenyl)-1,3,3'-trimethylindane (DAPI).

14. The prepreg of claim 12, wherein the reinforcement fibers are unidirectional carbon fibers.

* * * * *